Aug. 24, 1965    J. C. BELL ETAL    3,201,873
GAGE BLOCK
Filed May 29, 1963    2 Sheets-Sheet 1
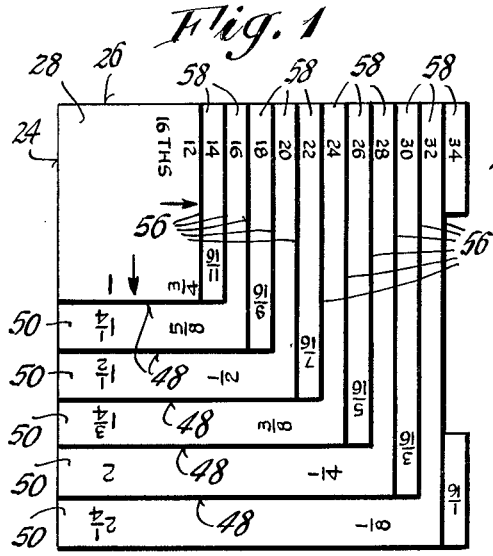
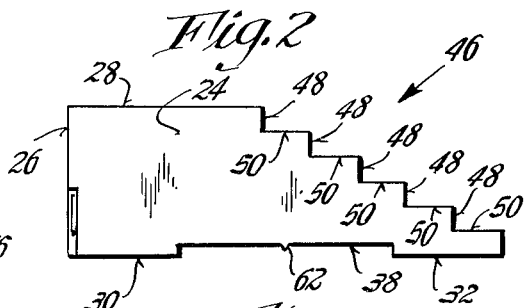
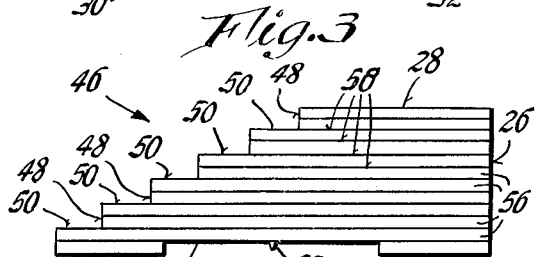
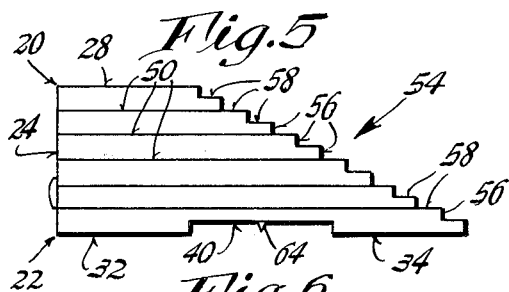
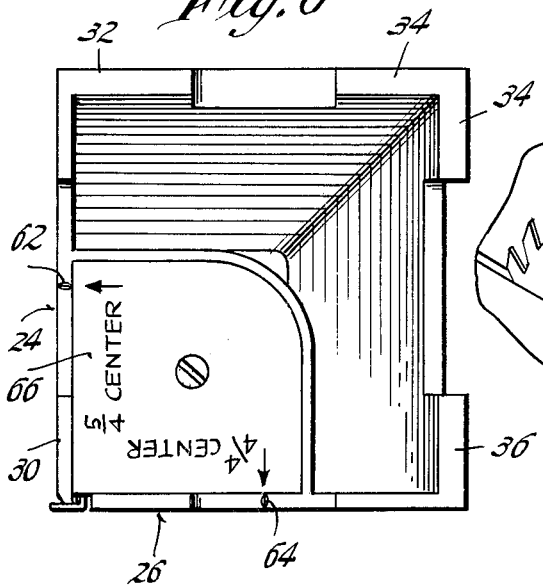
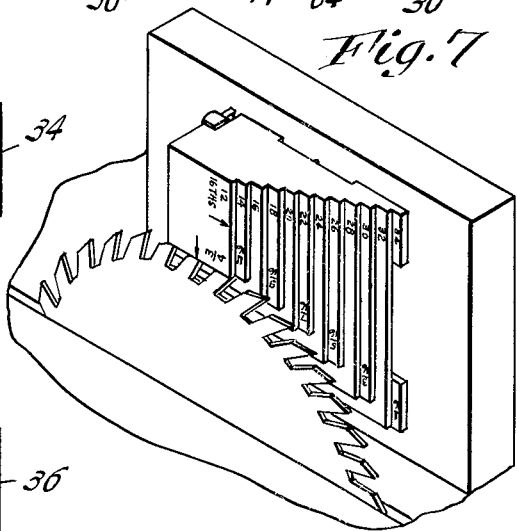
INVENTORS
James C. Bell
George H. Horstmann
BY
H. Gilbert Lehmann
AGENT Aug. 24, 1965  J. C. BELL ETAL  3,201,873
GAGE BLOCK
Filed May 29, 1963  2 Sheets-Sheet 2
Fig. 8
Fig. 9
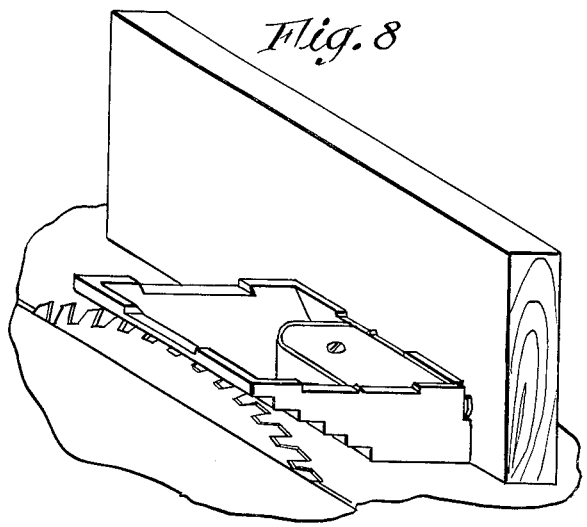
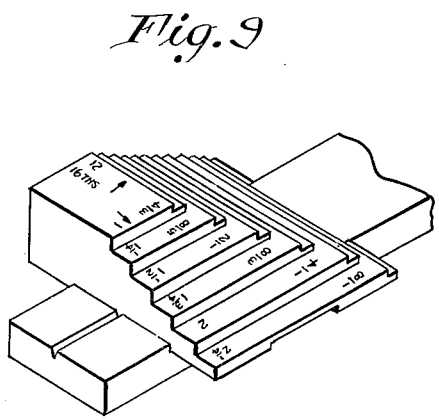
Fig. 10
Fig. 11
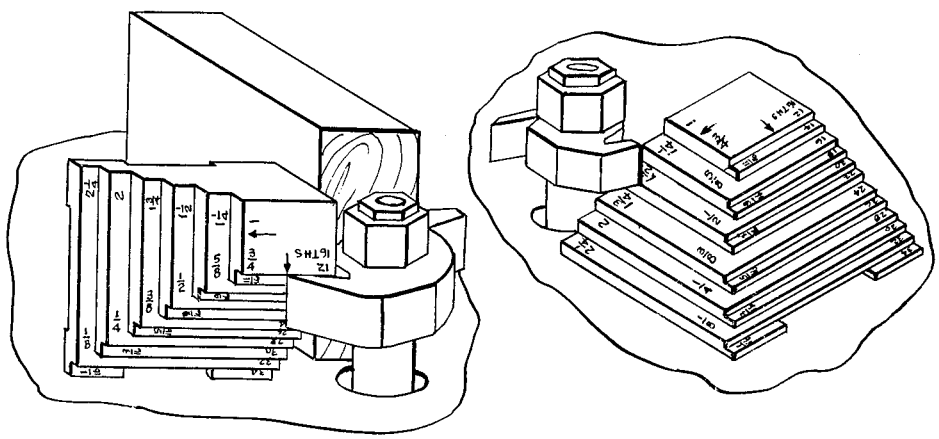
INVENTORS
James C. Bell
George H. Horstmann
BY
AGENT

United States Patent Office 3,201,873
Patented Aug. 24, 1965

3,201,873
GAGE BLOCK
James C. Bell, 92 High View Drive, and George H. Horstmann, 88 Raven Terrace, both of Stratford, Conn.
Filed May 29, 1963, Ser. No. 284,058
5 Claims. (Cl. 33—168)

This invention relates to small gages intended to replace scales and the like in effecting different settings of equipment, and more particularly to devices of this type which are in the form of blocks having contoured surfaces arranged for engagement with cooperable parts of a machine such as a saw or router to set the same for establishing the desired dimensions.

An object of the invention is to provide a novel and improved gage block for the above purpose, wherein there is provided a graduated stepped gaging edge so arranged as to be usable for a number of different setting operations, said block having a construction such that it may be readily cast or molded to effect an economical fabrication.

Another object of the invention is to provide an improved gage block as above set forth, which has an additional graduated stepped gaging edge correlated with the first such edge and adapted to enable additional different setting operations to be conveniently effected, all without appreciably increasing the fabrication cost.

A further object of the invention is to provide an improved gage block in accordance with the foregoing, wherein simplified marking means are provided to enable longitudinal center scribing of different-sized pieces of lumber to be easily and quickly done.

A feature of the invention resides in the provision of a novel gage block as outlined, which by virtue of the plurality of different setting operations made possible, is extremely versatile while at the same time retaining the utmost simplicity.

Another feature of the invention resides in the provision of a novel gage as outlined, wherein dependence is not had on moving parts to effect the setting but instead the gaging structures comprise a one-piece or monolithic block.

Other features of the invention reside in the provision of a gage block as characterized, which is readily fabricated either as a plastic molding or else as a metal casting, which may be withdrawn from simple inexpensive mold or die cavities without difficulty or involvement, and which requires the least amount of finishing or subsequent operations after the initial forming.

Other features and advantages will hereinafter appear.

In the drawings accompanying this specification, similar characters of reference are used to designate like components throughout the several views, in which:

FIGURE 1 is a top plan view of the novel gage block as provided by the invention.

FIG. 2 is an elevational view of the left edge of the gage block, considering FIG. 1.

FIG. 3 is an elevational view of the right edge of the gage block, considering FIG. 1.

FIG. 4 is an elevational view of the uppermost edge of the gage block, considering FIG. 1.

FIG. 5 is an elevational view of the lowermost edge of the gage block, considering FIG. 1.

FIG. 6 is a bottom plan view of the gage block.

FIG. 7 is a pictorial representation illustrating the use of the gage block in setting the rip fence or guide of a circular (table) saw.

FIG. 8 is a pictorial illustration illustrating the use of the gage block in setting for the depth of cut of a circular (table) saw.

FIG. 9 is a pictorial representation illustrating the center scribing of a piece of lumber by means of the gage block.

FIG. 10 is a pictorial representation illustrating the setting of a router cutter for height and depth of cut.

FIG. 11 is a pictorial representation showing another procedure for setting the cutter of a router.

Referring first to FIGS. 1–6, the gage block of the invention is shown as being in the form of a relatively thick slab of generally rectangular configuration having two squared adjoining corner portions 20 and 22 characterized by a total of four faces 24, 26, 28 and 30. A first set of two of said faces, namely the faces 24, 26 are normal to each other and are common to both of the said corner portions 20, 22. The said faces 24, 26 are also normal respectively to the second or remaining set of two faces 28, 30 and the latter are in parallelism with each other. The face 28 is of rectangular configuration and generally considered as the upper or top face of the gage block, whereas the face 30 is L-shaped and considered to comprise a lower or bottom face of the block.

Preferably, as shown, the gage block also has three additional generally L-shaped bottom faces 32, 34 and 36, all four bottom faces being disposed respectively at the four corners of the block. The bottom faces 30, 32, 34 and 36 may be considered as comprising surfaces of the foot portions of the block, inasmuch as said surfaces are separated by four wide spaces 38, 40, 42 and 44 for a purpose which will be later explained.

It will be noted that the top surface 28 of the block, which is virtually of square configuration, is disposed at the thickest corner portion of the block.

In accordance with the invention, the gage block has a stepped gaging face designated generally by the numeral 46, said gaging face being disposed opposite the edge face 26 and comprising alternate shoulder surfaces 48 and land surfaces 50 disposed normal to each other and respectively parallel to the one edge face 26 and to the two parallel faces 28, 30. Preferably each of the lands 50 has a width of one-quarter inch, and the lands may be provided with dimensional indications as shown in FIG. 1, in accordance with this and other figures involving the thickness of the steps. Each of the shoulders 48 preferably has a width of one-eight inch, whereby the height of the block, i.e. the dimension between the faces 28, 30 is ¾ of an inch when six shoulders are involved.

By the above organization the gage block may be readily accurately used to set a rip fence or guide of a circular (table) saw, within close limits and in one-eighth inch steps up to ¾ of an inch. This is illustrated in FIG. 7, for instance. Also, the height of a router cutter may be set, using the stepped gaging face 46 in a manner depicted in FIG. 11. Or, the depth of cut of a circular saw may be set in one-eighth inch steps up to ¾ of an inch by utilizing the block in the manner shown in FIG. 1.

Further, in accordance with the invention, an additional graduated or stepped gaging edge designated generally by the numeral 54 is provided on the gage block, being correlated with the first gaging face 46 and being adapted to enable additional different setting operations to be conveniently effected, without appreciably increasing the fabrication cost of the block. The gaging face 54 is located generally opposite the edge face 24 of the block, and has shoulder surfaces 56 and land surfaces 58 which are respectively parallel to the edge surface 24 and to the upper and lower surfaces 28, 30 of the block. The shoulder surfaces 56 are also normal to the shoulder surfaces 48. Alternate ones of the land surfaces 58 are continuations of and lie in the same plane as respective adjoining land surfaces 50. Each of the remaining alternate land surfaces 58 is disposed midway between two adjoining land surfaces of the set.

Preferably the width of each of the shoulder surfaces 56 is 1/16 of an inch, and since there are twelve such shoulder surfaces shown, this would evenly divide a block which is made 3/4 of an inch thick. The width of each of the land surfaces 58 is preferably 1/8 of an inch, and accordingly gaging in 1/16 inch and 1/8 inch steps are made possible by the provision of the stepped gaging face 54, the block being used in a manner similar to that described generally in connection with the stepped gaging face 46. In FIG. 10 the stepped gaging face 54 is shown as utilized to set the cutter knife in a router. The depth of cut of the router knife may also be set, by suitable positioning of the gage block, as will be readily understood.

The lands 58 of the gaging face 54 may be provided with dimensional indicia or other numbers as indicated in FIG. 1.

Further, in accordance with the invention, the gage block is provided with means by which longitudinal center scribing of different-sized pieces of lumber may be easily and quickly effected. In accomplishing this, the spaces 38, 40, 42 and 44 are utilized. The spaces 38 and 42, being opposite each other, are made to have the same width measured between the pairs of leg portions having the surfaces 30, 32 and 34, 36. Such width may, for example, be 1 1/8 inches whereby a piece of 1 1/4 dressed lumber may be accommodated therein. Similarly, the spaces 40 and 44 may have a width of 25/32 of an inch to accommodate one inch lumber. The block is provided with two scribing points or projections 62 and 64 disposed respectively in the spaces 38 and 44, being centrally located therein. The use of the block in centerscribing a piece of lumber is depicated in FIG. 9, the block being pulled along the edge of the lumber while pressure is being applied to cause one of the scribing projections to mark the edge.

It will now be readily understood from the foregoing that the gage block as provided by this invention is extremely simple in construction, the gaging structure being entirely in one piece or monolithic. The gage block may be hollow at its underside, thereby to enable it to be economically, readily molded of plastic substance, or cast of metal. The hollow portion of the block may be provided with a cover plate 66, whereby the enclosed space may contain useful articles such as a coiled steel tape or ruler, or the like. Because the block has no undercut walls, the mold or die cavities may be of simple construction, and the block after being formed may be readily withdrawn from the cavities without difficulty. The gaging shoulders and lands may be molded or formed with the desired accuracy, without difficulty. The gage block is relatively small whereby it may be readily held in the hand and used even where the available space is cramped.

The gage block may also be used in setting molding cutters, spindle shapers, mortising bits, drill bits, planer heads, radial arm saws, milling cutters, end mills and any other adjustable setting cutting tools.

Variations and modifications may be made within the scope of the claims, and portions of the improvement may be used without others.

We claim:

1. A gage comprising a relatively small block adapted to fit into the hand and to be conveniently handled and positoned against a cutting tool and work guide, said block having two squared adjoining corner portions characterized by a total of four faces, a first set of two of said faces being normal to each other and common to both of said corner portions, said two faces being also normal respectively to a second or remaining set of two faces and the latter being in parallelism, said block having a stepped gaging face disposed opposite one of said first-mentioned two faces, said gaging face comprising alternate shoulder surfaces and land surfaces disposed normal to each other and respectively parallel to said one face and to said remaining two faces, wherein:
   (a) The block has a second stepped gaging face similar to the first-mentioned gaging face and provided with alternate shoulders and lands disposed normal to each other and respectively parallel to the other of said first-mentioned two faces and to said remaining two faces,
   (b) alternate lands of one of said gaging faces are paired with consecutive lands of the other gaging face, said paired lands comprising single continuous coplanar surfaces,
   (c) the second gaging face has substantially twice the number of shoulders as the first-mentioned gaging face,
   (d) each shoulder of the first-mentioned gaging face meets two shoulders of the second gaging face, and
   (e) the second gaging face has substantially twice the number of lands as the first-mentioned gaging face.

2. A gage comprising a relatively small block adapted to fit into the hand and to be conveniently handled and positioned against a cutting tool and work guide, said block having two squared adjoining corner portions characterized by a total of four faces, a first set of two of said faces being normal to each other and common to both of said corner portions, said two faces being also normal respectively to a second or remaining set of two faces and the latter being in parallelism, said block having a stepped gaging face disposed opposite one of said first-mentioned two faces, said gaging face comprising alternate shoulder surfaces and land surfaces disposed normal to each other and respectively parallel to said one face and to said remaining two faces, wherein:
   (a) the block has a second stepped gaging face similar to the first-mentioned gaging face and provided with alternate shoulders and lands disposed normal to each other and respectively parallel to the other of said first-mentioned two faces and to said remaining two faces,
   (b) lands of the said gaging faces are paired, said paired lands comprising single continuous coplanar surfaces,
   (c) one of said second two faces constitutes a portion of the base surface of the block,
   (d) the other of said second two faces has substantially a square configuration and a size constituting a small fractional part of the base surface of the block,
   (e) said one of the second two faces is of substantially square configuration and constitutes a raised small fractional portion of the said base surface,
   (f) the block has additional raised portions of the said base surface,
   (g) said raised portions constituting feet on which the block may rest,
   (h) the base surface of the block is rectangular,
   (i) four raised portions are provided on the base surface of the block, one at each corner thereof,
   (j) a sharp tooth is provided on the base surface of the block, disposed at one edge thereof and between a pair of raised portions, said tooth being adapted to mark pieces of lumber when the block is shifted along the same with the pieces guided between the pair of raised portions.

3. A gage as in claim 2, wherein:
   (a) a second sharp tooth is provided on the base surface of the block, disposed at another edge thereof and between a different pair of raised portions, for marking pieces of lumber when the block is shifted along the same with the pieces guided between the said different pair of raised portions,
   (b) said first-mentioned pair of raised portions having a spacing which is different from that of the said different pair of raised portions, thereby to accommodate a piece of lumber of another size.

4. A gage as in claim 3, wherein:
   (a) all of the raised portions of the base surface are of rectangular configuration.

5. A gage as in claim 4 wherein:
(a) the base surface of the block has a different pair of spaced raised portions between which pieces of lumber may be guided,
(b) said different pair of raised portions having a spacing which is different from that of the first-mentioned pair of raised portions, and
(c) a second sharp tooth is provided on the base surface of the block at another edge thereof and between said different pair of raised portions, thereby to accommodate pieces of lumber of a different size.

References Cited by the Examiner
UNITED STATES PATENTS

| | | | |
|---|---|---|---|
| 1,166,968 | 1/16 | Carter | 33—42 |
| 2,536,401 | 1/51 | Victor | 33—168 |

ISAAC LISANN, *Primary Examiner.*